(12) United States Patent
Mejia et al.

(10) Patent No.: US 8,176,717 B1
(45) Date of Patent: May 15, 2012

(54) COMBINATION PEST AND GARDENING TOOL APPARATUS

(76) Inventors: Saul Mejia, Van Nuys, CA (US);
Rosemary Mejia, Van Nuys, CA (US)

(*) Notice: Subject to any disclaimer, the term of this patent is extended or adjusted under 35 U.S.C. 154(b) by 217 days.

(21) Appl. No.: 12/754,175

(22) Filed: Apr. 5, 2010

(51) Int. Cl.
*A01D 7/00* (2006.01)
(52) U.S. Cl. ......................................... 56/400.04; 7/114
(58) Field of Classification Search .. 56/400.04–400.06, 56/400.19, 400.2; 7/114–116
See application file for complete search history.

(56) References Cited

U.S. PATENT DOCUMENTS

| | | | | |
|---|---|---|---|---|
| 1,275,382 A | * | 8/1918 | Camp | 56/400.04 |
| 1,465,089 A | * | 8/1923 | Parker | 56/400.04 |
| 5,185,992 A | * | 2/1993 | Garcia | 56/400.04 |
| 5,461,849 A | * | 10/1995 | Allen | 56/400.06 |
| D386,051 S | | 11/1997 | Cuzzi | |
| 6,619,023 B1 | | 9/2003 | Marcone | |
| 7,171,779 B1 | | 2/2007 | Kok | |
| 2003/0180085 A1 | | 9/2003 | Hughes | |

* cited by examiner

*Primary Examiner* — Alicia Torres

(57) ABSTRACT

The combination gardening tool and pest apparatus provides a probe shaft having a first end spaced apart from a second end, an upper shaft disposed above and parallel with the probe shaft, a first insert slideably disposed within the upper shaft, a spade affixed outwardly from the first insert, the spade and first insert extendable to a position beyond the probe second end, the spade and first insert retractable to a position medial to the probe second end, a lower shaft disposed below and parallel with the probe shaft, a second insert slideably disposed within the lower shaft, a downwardly disposed rake affixed outwardly to the lower shaft, the rake and second insert extendable to a position beyond the probe first end, the rake and second insert retractable to a position medial to the probe first end.

14 Claims, 3 Drawing Sheets

COMBINATION PEST AND GARDENING TOOL APPARATUS

BACKGROUND OF THE INVENTION

Various tools are popular with those tending gardens, lawns, and the like. There also exist combination tools that offer more than one function. What has been needed and heretofore present, though, is a gardening type tool apparatus that provides a rake, a spade, and a probe for seeking out pests such as gophers, moles, and other ground dwellers that damage gardened surfaces. Additionally, such a needed tool is more convenient and easier and quicker to use if implements of the tool do not have to be changed in order to solve the problem. The present apparatus uniquely provides such a tool.

FIELD OF THE INVENTION

The combination gardening tool and pest apparatus relates to lawn and garden tools and more especially to a combination tool apparatus that provides a telescoping spade, a telescoping rake, and a double-ended probe for seeking out underground pests.

SUMMARY OF THE INVENTION

The general purpose of the combination gardening tool and pest apparatus, described subsequently in greater detail, is to provide a combination gardening tool and pest apparatus which has many novel features that result in an improved combination gardening tool and pest apparatus which is not anticipated, rendered obvious, suggested, or even implied by prior art, either alone or in combination thereof.

To attain this, the combination gardening tool and pest apparatus provides a double-end probe used in probing for pests, such as but not limited to gophers and moles. The apparatus also provides a rake on one end and a spade on the other. Each of the rake and spade may be extended laterally beyond one of the probe ends and retracted to positions medial to the probe ends. The upper and lower shafts with inserts that provide for tool extension may be positioned apart from the centrally disposed probe shaft for ease of operation. Various devices may be used to position the sliding inserts within the shafts as chosen, and secure same. Such devices include but are not limited to ball detents and twist, locking collars.

Handles may be provided and may be extended from the probe shaft to the upper and lower shafts. Handles may be perpendicular to the shafts.

Experimentation has taught that a 10 inch width spade is ideally sized for addressing pests without undue lawn and garden damage. Additionally, the slightly upward spade bend disposed in the spade at the attachment reinforcement further importantly adds to spade efficiency. The probe shaft may be supplied with removable points to ensure point sharpness and to provide various shapes and sizes of the probe shaft points. Further, the rake and spade may be completely removed from their corresponding insert to facilitate storage.

Thus has been broadly outlined the more important features of the improved combination gardening tool and pest apparatus so that the detailed description thereof that follows may be better understood and in order that the present contribution to the art may be better appreciated.

An object of the combination gardening tool and pest apparatus is to provide a spade.

Another object of the combination gardening tool and pest apparatus is to provide a telescoping spade.

A further object of the combination gardening tool and pest apparatus is to provide a rake.

An added object of the combination gardening tool and pest apparatus is to provide a telescoping rake.

And, an object of the combination gardening tool and pest apparatus is to provide a double ended pest probe.

Still another object of the combination gardening tool and pest apparatus is to provide for extension and retraction of the rake and spade to positions both medial and lateral to the probe shaft ends.

These together with additional objects, features and advantages of the improved combination gardening tool and pest apparatus will be readily apparent to those of ordinary skill in the art upon reading the following detailed description of presently preferred, but nonetheless illustrative, embodiments of the improved combination gardening tool and pest apparatus when taken in conjunction with the accompanying drawings.

In this respect, before explaining the current embodiments of the improved combination gardening tool and pest apparatus in detail, it is to be understood that the combination gardening tool and pest apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved combination gardening tool and pest apparatus. It is therefore important that the claims be regarded as including such equivalent constructions insofar as they do not depart from the spirit and scope of the combination gardening tool and pest apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the combination gardening tool and pest apparatus generally designated by the reference number 10 will be described.

Figure 1:
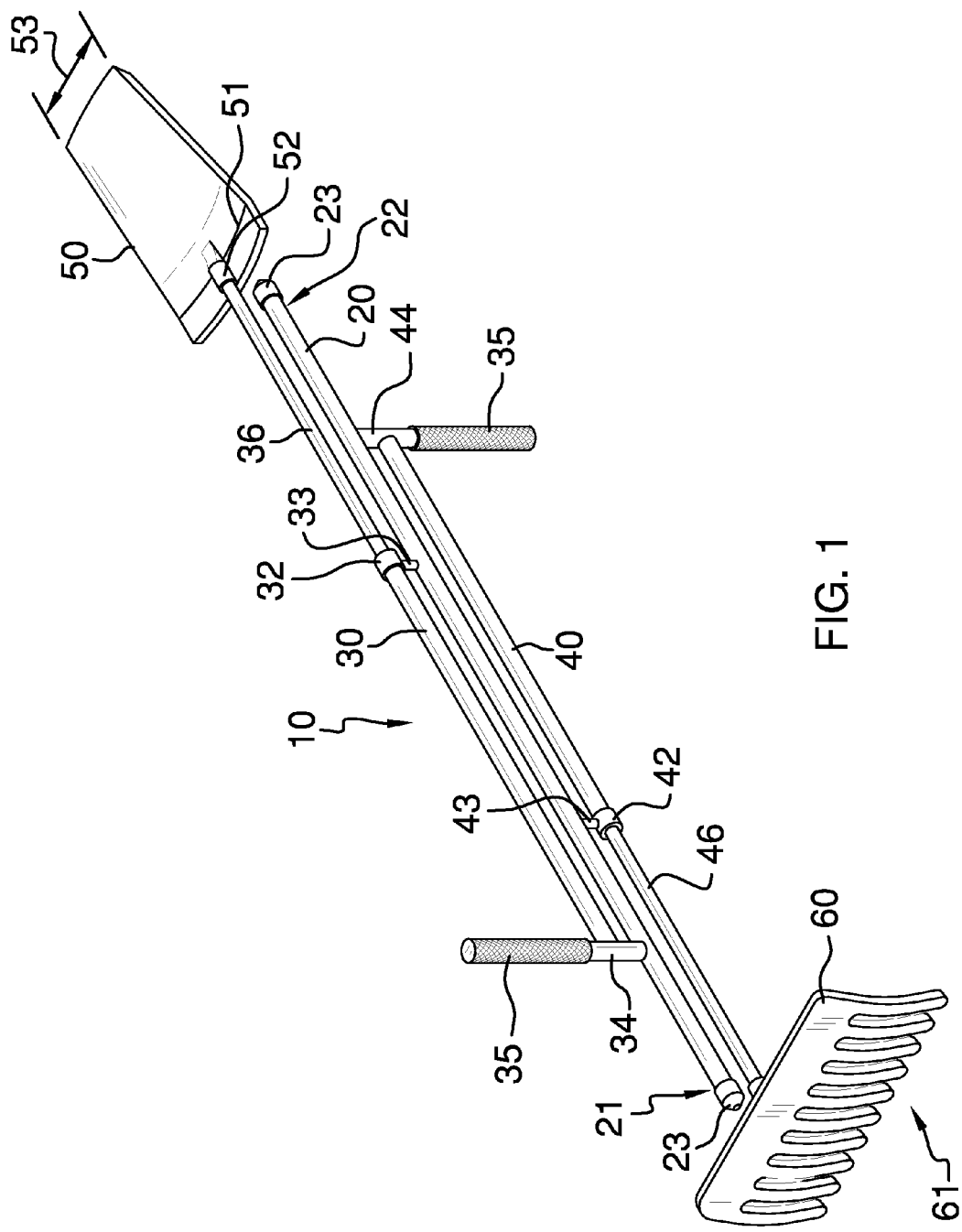
FIG. 1 is a perspective view with spade and rake extended.

Referring to FIG. 1, the apparatus 10 partially comprises the probe shaft 20 having a first end 21 spaced apart from the second end 22.

Figure 2:
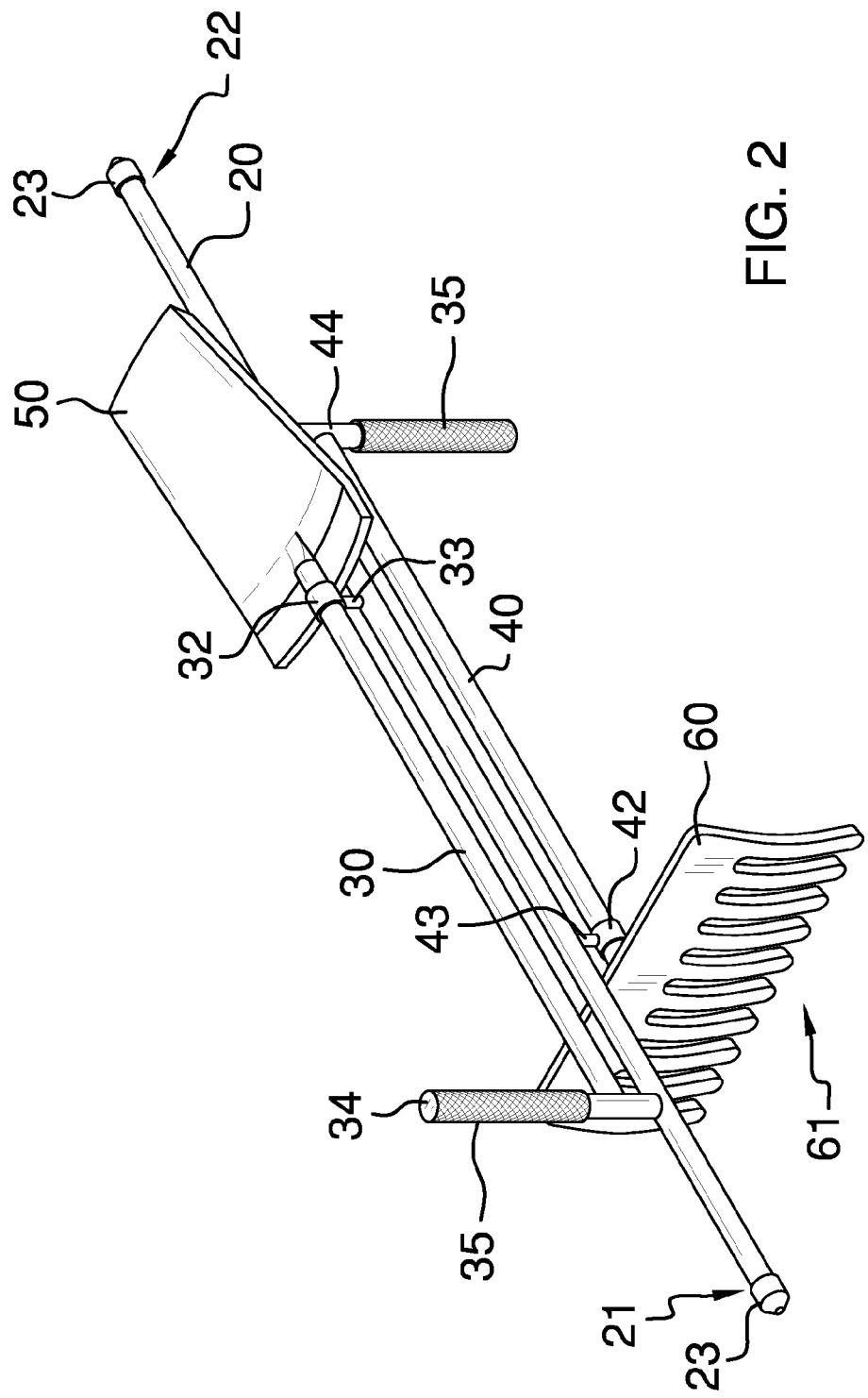
FIG. 2 is a perspective view with spade and rake retracted.
Figure 3:
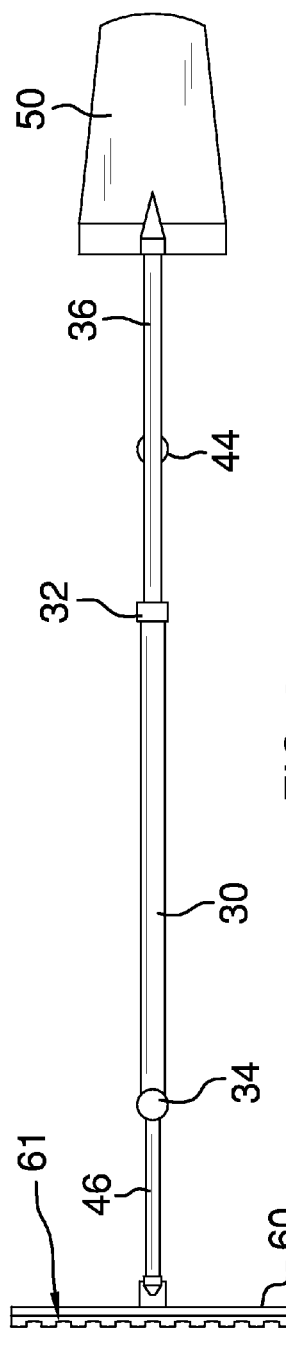
FIG. 3 is a top plan view with spade and rake extended.
Figure 4:
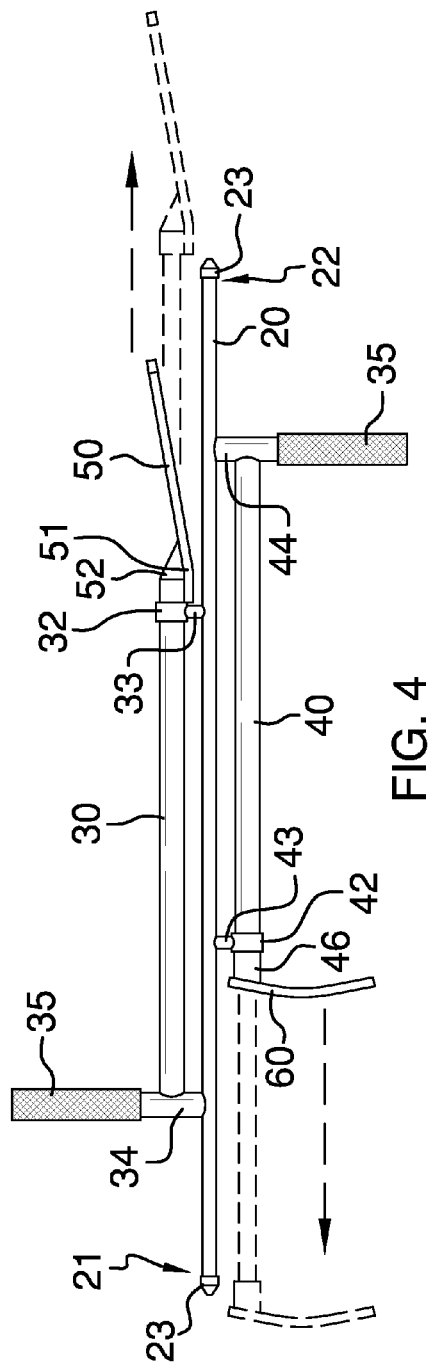
FIG. 4 is a lateral elevation view with spade and rake retracted.

Referring to FIG. 2, a removable probe point 23 is disposed on each probe shaft 20 end.

Referring again to FIG. 1, the first handle 34 is extended perpendicularly upward from the probe shaft 20 most proximal to the first end 21. The upper collar stalk 33 is extended perpendicularly upward from the probe shaft 20 most proximal to the second end 22.

The first locking collar 32 is disposed on the upper collar stalk 33. The second handle 44 is extended perpendicularly downward from the probe shaft 20 most proximal to the second end 22. Each of the handles is fitted with a grip 35. The lower collar stalk 43 is extended perpendicularly downward from the probe shaft 20 most proximal to the first end 21. The second locking collar 42 is affixed to the lower collar stalk 43. The upper shaft 30 is disposed above and spaced apart from the probe shaft 20. The upper shaft 30 is parallel to the probe shaft 20. The upper shaft 30 is affixed to the first handle 34 and the first locking collar 32. The lower shaft 40 is disposed below and spaced apart from the probe shaft 20. The lower shaft 40 is parallel to the probe shaft 20. The lower shaft 40 is affixed to the second handle 44 and the lower collar stalk 43.

Referring to FIG. 4 and again to FIG. 1, the first sliding insert 36 is slideably disposed within the upper shaft 30. The first sliding insert 36 is selectively secured as chosen by the first locking collar 32. The first sliding insert 36 is selectively extendable beyond the probe shaft 20 second end 22. The first sliding insert 36 is also retractable such that the probe shaft 20 second end 22 extends laterally beyond the first sliding insert 36 with attached spade 50. The spade 50 is affixed distally on the first sliding insert 36. The spade 50 is affixed via the attachment reinforcement 52. The spade 50 ideally has a width 53 of about 10 inches. A slightly upward spade bend 51 is disposed in the spade 50 at the attachment reinforcement 52. The second sliding insert 46 is slideably disposed within the lower shaft 40.

The second sliding insert 46 is selectively secured as chosen by the second locking collar 42. The second sliding insert 46 with attached rake 60 is extendable beyond the probe shaft 20 first end 21.

The downwardly disposed rake 60 is disposed distally on the second sliding insert 46. The rake 60 has downwardly disposed tines 61.

With respect to the above description then, it is to be realized that the optimum dimensional relationships for the parts of the combination gardening tool and pest apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the combination gardening tool and pest apparatus.

Of note, the combination of claimed elements provides an unpredictable and unexpected result that is not rendered obvious by one skilled in the art. By having both a spade and a rake immediately available to address pests, usually after probing with the probe shaft, pests are allowed little opportunity for escape.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the combination gardening tool and pest apparatus may be used.

Therefore, the foregoing is considered as illustrative only of the principles of the combination gardening tool and pest apparatus. Further, since numerous modifications and changes will readily occur to those skilled in the art, it is not desired to limit the combination gardening tool and pest apparatus to the exact construction and operation shown and described, and accordingly, all suitable modifications and equivalents may be resorted to, falling within the scope of the combination gardening tool and pest apparatus.

What is claimed is:

1. A combination pest and gardening tool apparatus comprising, in combination:
    a probe shaft having a first end spaced apart from a second end;
    an upper shaft disposed above and parallel with the probe shaft;
    a first insert slideably disposed within the upper shaft;
    a spade affixed outwardly from the first insert;
    the spade and first insert extendable to a position beyond the probe second end, the spade and first insert retractable to a position medial to the probe second end;
    a lower shaft disposed below and parallel with the probe shaft;
    a second insert slideably disposed within the lower shaft;
    a downwardly disposed rake affixed outwardly from the second insert;
    the rake and second insert extendable to a position beyond the probe first end, the rake and second insert retractable to a position medial to the probe first end.

2. The apparatus according to claim 1 further comprising a first handle extended from the probe shaft most proximal to the first end, the first handle affixed to the upper shaft;
    a second handle extended from the probe shaft most proximal to the second end, the second handle affixed to the lower shaft.

3. The apparatus according to claim 1 wherein the probe shaft further comprises a probe point disposed on each probe shaft end.

4. The apparatus according to claim 2 wherein the probe shaft further comprises a probe point disposed on each probe shaft end.

5. The apparatus according to claim 3 wherein the probe shaft points are further removable.

6. The apparatus according to claim 4 wherein the probe shaft points are further removable.

7. The apparatus according to claim 1 wherein the upper shaft disposed above the probe shaft is diametrically disposed from the lower shaft disposed below the probe shaft.

8. The apparatus according to claim 2 wherein the upper shaft disposed above the probe shaft is diametrically disposed from the lower shaft disposed below the probe shaft.

9. The apparatus according to claim 3 wherein the upper shaft disposed above the probe shaft is diametrically disposed from the lower shaft disposed below the probe shaft.

10. The apparatus according to claim 4 wherein the upper shaft disposed above the probe shaft is diametrically disposed from the lower shaft disposed below the probe shaft.

11. The apparatus according to claim 5 wherein the upper shaft disposed above the probe shaft is diametrically disposed from the lower shaft disposed below the probe shaft.

12. The apparatus according to claim 6 wherein the upper shaft disposed above the probe shaft is diametrically disposed from the lower shaft disposed below the probe shaft.

13. A combination pest and gardening tool apparatus comprising, in combination:
    a probe shaft having a first end spaced apart from a second end;
    a probe point disposed on each probe shaft end;
    a first handle extended perpendicularly upward from the probe shaft most proximal to the first end;
    an upper collar stalk extended perpendicularly upward from the probe shaft most proximal to the second end;
    a first locking collar disposed on the upper collar stalk;
    a second handle extended perpendicularly downward from the probe shaft most proximal to the second end;
    a lower collar stalk extended perpendicularly downward from the probe shaft most proximal to the first end;
    a second locking collar affixed to the lower collar stalk;

an upper shaft disposed above and spaced apart from the probe shaft, the upper shaft parallel to the probe shaft, the upper shaft affixed to the first handle and the first locking collar;

a lower shaft disposed below and spaced apart from the probe shaft, the lower shaft parallel to the probe shaft, the lower shaft affixed to the second handle and the lower collar stalk, the upper shaft disposed above the probe shaft diametrically disposed from the lower shaft disposed below the probe shaft;

a first sliding insert slideably disposed within the upper shaft, the first sliding insert selectively secured as chosen by the first locking collar, the first sliding insert extendable beyond the probe shaft second end;

a spade affixed distally on the first sliding insert, the spade affixed via a spade attachment reinforcement, the spade having a width of about 4 inches;

a slightly upward spade bend disposed in the spade at the attachment reinforcement;

a second sliding insert slideably disposed within the lower shaft, the second sliding insert selectively secured as chosen by the second locking collar, the second sliding insert extendable beyond the probe shaft first end;

a downwardly disposed rake disposed distally on the second sliding insert, the rake having downwardly disposed tines.

14. The apparatus according to claim 13 wherein each probe point is further removable.

* * * * *